Oct. 29, 1929.  B. P. HIGBY  1,733,262
HOSE NOZZLE
Filed March 19, 1928
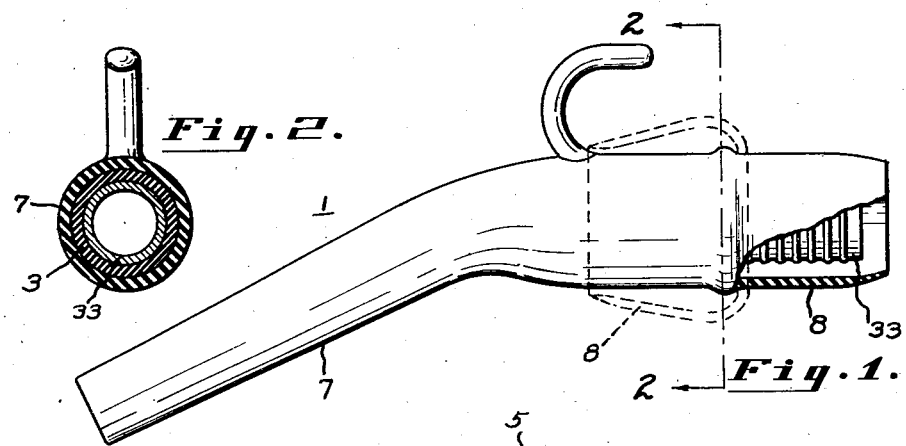
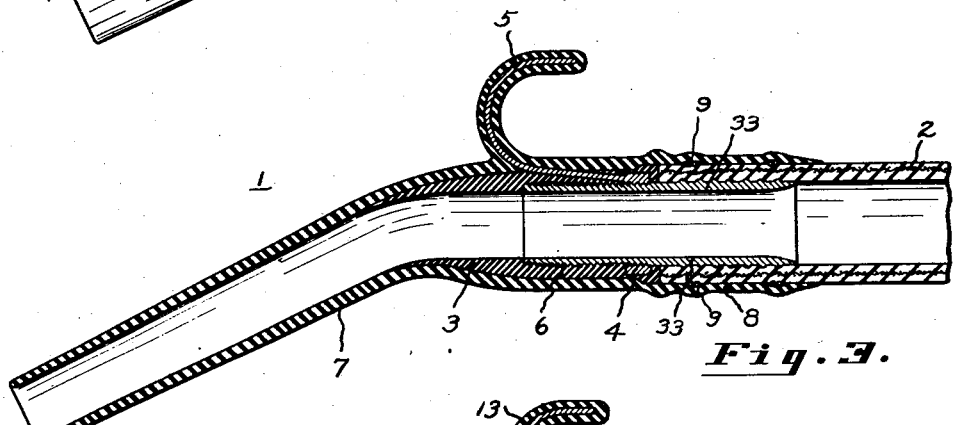
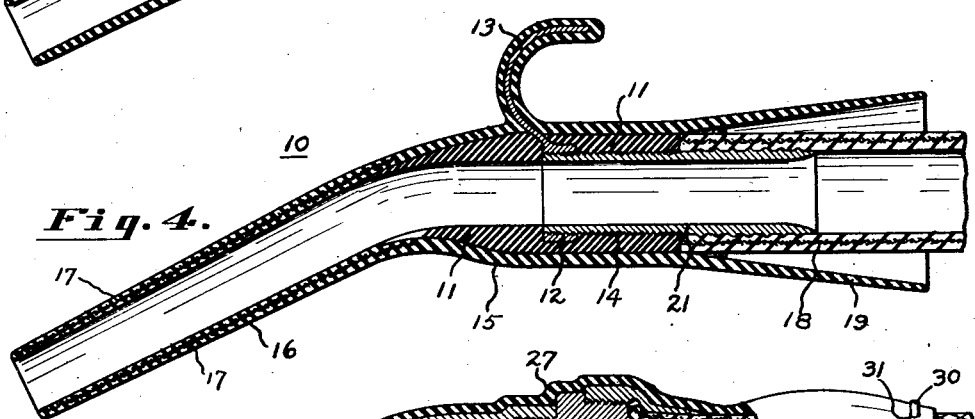
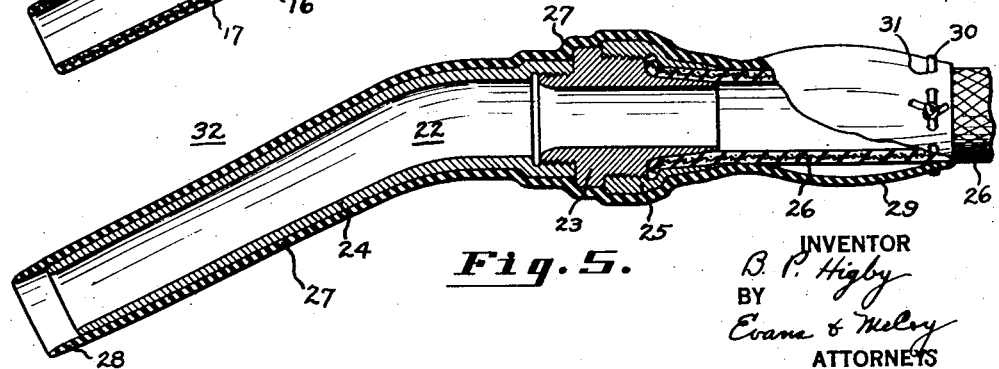
INVENTOR
B. P. Higby
BY
Evans & McCoy
ATTORNEYS Patented Oct. 29, 1929

1,733,262

UNITED STATES PATENT OFFICE

BEECHER P. HIGBY, OF YOUNGSTOWN, OHIO

HOSE NOZZLE

Application filed March 19, 1928. Serial No. 262,866.

This invention relates to nozzles and more particularly to a nozzle for use with a gasoline tank filling hose.

Automobile gasoline tanks are ordinarily filled from storage tanks by means of a flexible hose having a metal nozzle, said nozzle being inserted into the neck of the gasoline tank during the filling operation. In disposing a nozzle into a gasoline tank and removing said nozzle therefrom, it frequently happens that said nozzle or adjacent metal parts of the hose connection accidentally contact with portions of the automobile body or fender to scratch or otherwise mar the same. Also, gasoline is frequently spilled on the gasoline tanks and adjacent parts, resulting in deterioration and smudging of the automobile finish. These features are particularly objectionable when the gasoline tank is filled through the cowl of the automobile.

An object of the invention is to provide a nozzle for a gasoline hose having an outer surface of rubber or other similar material sufficiently soft to prevent marring of automobile finish. Other objects are to provide a rubber gasoline hose nozzle of advantageous construction, and further to provide means for preventing leakage gasoline from the union between such nozzle and the hose from dripping onto the automobile during the filling operation.

Other objects of the invention will be apparent to those skilled in the art from the written description herein made and from the appended drawings, wherein:

Figure 1 is an elevation partly broken away showing one form of nozzle contemplated by my invention;

Fig. 2 is a transverse section taken on line 2—2 of Fig. 1;

Fig. 3 is a longitudinal section through the nozzle shown in Fig. 1;

Fig. 4 is a longitudinal section through a modified form of nozzle contemplated by my invention; and Fig. 5 is a longitudinal section partly in elevation illustrating another modification of my invention.

My invention contemplates briefly a gasoline hose nozzle having its exterior surface of material such as rubber of sufficient softness to prevent injury to automobile finish during the mechanical manipulation of the nozzle. The outer or discharge end of the nozzle may be relatively flexible in character to impart flexibility and relatively non-breakable characteristics thereto and to render same resistant to rough handling. The nozzle discharge end is preferably of relatively soft material to prevent marring of automobile finish during the manipulation of said nozzle. The nozzle may further embody means extending from the nozzle upwardly over the hose beyond the connection between said hose and nozzle to provide a soft-surfaced covering for any metal hose connection and to prevent leakage from such connection onto automobile finish.

One modification of my invention is illustrated in Figs. 1, 2 and 3 wherein a nozzle 1 is shown connected to a gasoline hose 2. The nozzle 1 is shown as comprising a hard rubber inner member 3 having molded thereto a metal ring 4 having a hook 5 integral with or secured thereto. Threads 6 may be molded or otherwise formed in the interior of said hollow or inner member 3. In some cases it may be desirable, of course, to mold a metal sleeve or bushing in the inner member 3 and to form the threads 6 in such metal bushing. The inner member 3 may, of course, be bent or shaped to impart a bend to the outer or discharge end of the nozzle. Said inner member 3 may extend to the discharge end of the nozzle or partly thereto as desired. The exterior rubber coating 7 of the nozzle 1 may be formed by molding rubber around the inner member 3 and hook 5, said rubber coating 7 being as previously stated sufficiently soft to prevent marring of automobile surface finish.

To prevent leakage from the connection of the nozzle 1 to the hose 2, the rubber coating 7 may extend inwardly over the hose 2 to form the closely adhering sleeve 8 arranged to engage the outer surface of the hose 2 sufficiently snugly to substantially prevent any leakage of gasoline from the nozzle and hose connection.

The nozzle 1 may be secured to the hose 2 by any suitable means such as the sleeve 33 which is shown as exteriorly shaped at one end to engage frictionally the inner surface of the hose 1 and as externally threaded at its outer end to cooperate with the threaded interior of the nozzle. Suitable fastening means such as the wires 9 may be employed to secure the sleeve 33 and hose 2 together in rigid fashion. This invention, of course, is not limited to any particular means for securing the nozzle to the hose.

One modification of my invention is illustrated in Fig. 4 wherein the nozzle 10 is shown as comprising a hard rubber or fibre inner member 11 having a ring 12 and hook 13 molded or otherwise secured therein, said inner member being interiorly threaded at 14 substantially in the manner described in connection with Fig. 2. The inner member 11 is shown as extending outwardly beyond the hook 13 partially toward the discharge end of the nozzle. A soft rubber coating 15 is shown as molded or otherwise secured on the exterior of the inner member 11, said coating extending well beyond the inner member 11 to form an elongated discharge end 16. The discharge end 16 is shown as reinforced by a cylindrical member 17 extending from the discharge end of the nozzle to the inner member 11. This reinforcing member 17 may be of any suitable material such as, for example, metal, wire mesh, spirally wound wire, or fabric. Such reinforcing member permits the discharge end 16 to be made of any requisite degree of rigidity without making said discharge end of undue thickness.

In Fig. 4 the rubber coating 15 is shown as extending inwardly from the nozzle 10 over the hose 18 to form a gauntlet-shaped sleeve 19 to receive any leakage gasoline from the connection between the nozzle 10 and hose 18 and thus prevent drip on automobile finish during the filling operation. The nozzle 10 is shown as secured to the hose 19 by means of a sleeve 21 similar to the sleeve 33 shown in Fig. 2.

In the manufacture of the nozzles illustrated, the inner members may be secured to the outer rubber coating by vulcanizing, or by the use of adhesives, or in any other suitable manner.

In Fig. 5 I have illustrated a modification in which substantially the entire interior of the nozzle 32 is formed of metal, which said inner nozzle portion may conform substantially to present day metal nozzles. The inner nozzle portion 22 is thus shown as comprising a metal bushing 23 to which is secured the metal discharge portion 24 and the metal sleeve 25, the hose 26 being arranged to be tightly secured intermediate said bushing 23 and sleeve 25. Disposed exteriorly of the inner nozzle portion 22 is the rubber external nozzle portion 27 which preferably completely encloses the inner portion 22. The rubber coating 27 is shown at 28 as extending somewhat beyond the outer end of the inner discharge portion 24 in order to prevent said metal portion 24 from contacting with finished surfaces of the automobile. The rubber coating 27 is shown as extending inwardly from the sleeve 25 over the hose 26 to form a sleeve 29 spaced from the hose 26 to receive any leakage gasoline from the hose and nozzle connection, the sleeve 29 being shown as gathered in and secured to the hose 26 by suitable means such as the thong 30. The rubber coating 27 may be molded onto the inner metal portion 22 or may be formed by rubber sheeting with the use of suitable adhesive, or in certain cases may be formed in tubular manner and slipped over the metal inner portion 22. The invention is, of course, not limited to the particular manner in which the coating 27 is formed and secured to the inner portion 22.

While I have shown hooks as molded into certain of the nozzles illustrated in the drawings, it will be understood that such hooks might be eliminated or formed in any other suitable manner. Where the nozzle is to include valve parts such as levers, etc., the exposed parts of such valve mechanism are preferably coated with rubber.

In its preferred form the nozzle is preferably relatively flexible near the end so that it may withstand considerable knocking about without danger of breaking. The nozzle might thus be sufficiently flexible to be bent over on itself. Such flexibility will not effect its usefulness since in filling a gasoline tank the nozzle is usually inserted practically up to the connection with the hose, and this part, as previously mentioned, is preferably reinforced by an internal member.

It will thus be seen that I have provided a gasoline filling hose nozzle which will not mar highly finished automobile surfaces even though said nozzle is handled in relatively careless fashion. My improved nozzle furthermore is relatively resistant to breakage even under rough handling. It will also be seen that I have provided advantageous means for preventing drip upon the automobile of gasoline from the connection between the nozzle and gasoline hose.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A nozzle adapted to be secured to a hose and arranged to be used in filling automobile gasoline tanks, said nozzle comprising, in combination, an inner tubular reinforcing member, and an outer hose portion forming the entire outer surface of the nozzle and composed of rubber sufficiently soft to prevent marring of automobile surface finish, said outer portion extending beyond said inner member whereby automobile finish may not be marred by manipulation of said nozzle.

2. A nozzle adapted to be secured to a hose and arranged to be used in filling automobile gasoline tanks, said nozzle comprising, in combination, a tubular inner member of molded material, a hook molded in said inner member, said inner member having a portion thereof shaped to cooperate with hose securing means, and an outer hose portion forming the entire outer surface of the nozzle and composed of rubber sufficiently soft to prevent marring of automobile surface finish, the exterior surface of said hook being also rubber covered.

3. A nozzle adapted to be secured to a hose and arranged to be used in filling automobile gasoline tanks, said nozzle comprising, in combination, a tubular inner member of hard rubber, a portion of the interior surface of said inner member being threaded to cooperate with hose fastening means, an outer rubber hose member disposed outwardly of said inner member and forming the entire outer surface of the nozzle and extending outwardly therebeyond to form a relatively flexible nozzle discharge end, said outer nozzle member being vulcanized to said inner member.

4. A nozzle adapted to be secured to a hose and arranged to be used in filling automobile gasoline tanks, said nozzle comprising, in combination, a tubular inner member, said inner member being shaped to cooperate with hose fastening means, an outer nozzle member forming the entire outer surface of the nozzle and composed of rubber sufficiently soft as not to mar automobile surface finish, said outer nozzle member being integrally secured to said inner nozzle member, said rubber outer member extending inwardly beyond said inner member in sleeve manner over said hose beyond the connection of said hose with said nozzle, and beyond metal connection members disposed exteriorly of said hose adjacent said connection whereby to prevent marring of automobile surface finish by such connection members and to prevent leakage from the hose connection onto the automobile during the filling operation.

5. In a gasoline hose and nozzle construction, a flexible hose, and a nozzle secured to said hose, said nozzle having its exterior surface formed completely of rubber sufficiently soft to prevent marring of automobile surfaces, said nozzle having a sleeve guard extending over the hose rearwardly beyond the connection between the hose and nozzle to prevent any leakage gasoline from said connection spilling upon automobile surfaces.

In testimony whereof I affix my signature.

BEECHER P. HIGBY.